US012719374B2

(12) United States Patent
Tatsuzue

(10) Patent No.: US 12,719,374 B2
(45) Date of Patent: Aug. 25, 2026

(54) POWER SUPPLY SUBSTRATE INCLUDING TRANSFORMER AND SNUBBER CIRCUIT

(71) Applicant: CANON KABUSHIKI KAISHA, Tokyo (JP)

(72) Inventor: Akira Tatsuzue, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/891,087

(22) Filed: Sep. 20, 2024

(65) Prior Publication Data

US 2025/0175086 A1 May 29, 2025

(30) Foreign Application Priority Data

Nov. 29, 2023 (JP) ................................. 2023-202274

(51) Int. Cl.
*G03G 15/00* (2006.01)
*H02M 1/34* (2007.01)
*H02M 3/335* (2006.01)

(52) U.S. Cl.
CPC .... *H02M 3/33523* (2013.01); *G03G 15/5004* (2013.01); *G03G 15/80* (2013.01); *H02M 1/348* (2021.05)

(58) Field of Classification Search
USPC ........................................................... 399/37
See application file for complete search history.

(56) References Cited

U.S. PATENT DOCUMENTS 9,342,030 B1 5/2016 Akira
9,665,060 B2 5/2017 Odate
2010/0039838 A1 2/2010 Carpenter
2014/0119065 A1 5/2014 Sugahara et al.
2016/0359417 A1 12/2016 Odate
2019/0222112 A1* 7/2019 Sakai ................ H02M 3/33523

FOREIGN PATENT DOCUMENTS

JP H03-135373 A 6/1991
JP 2000-060125 A 2/2000
JP 2001-095255 A 4/2001
(Continued)

OTHER PUBLICATIONS

Nov. 11, 2025 Office Action in Japanese Patent Application No. 2023-202274 (with English translation).

*Primary Examiner* — Quana Grainger
(74) *Attorney, Agent, or Firm* — Venable LLP

(57) ABSTRACT

A power supply substrate includes a transformer, switching element and a snubber circuit. The transformer includes primary and secondary windings. The switching element is connected to the primary winding. The snubber circuit is connected to the primary winding, the transformer includes first and second input terminals to which an input voltage is supplied, and mounted on a first surface of the power supply substrate. A second surface opposite to the first surface includes first and second solder portions for soldering. The first and second input terminals are soldered to the first and second solder portions, respectively. The snubber circuit includes a surface mounting component at least in a part thereof, is overlapped with the transformer as viewed in a direction perpendicular to the first surface of the power supply substrate, and is connected to the first and second solder portions.

11 Claims, 7 Drawing Sheets

(56) References Cited

FOREIGN PATENT DOCUMENTS

| | | | | | |
|---|---|---|---|---|---|
| JP | 2010-233289 | A | | 10/2010 | |
| JP | 2014-090625 | A | | 5/2014 | |
| JP | 2016-188925 | A | | 11/2016 | |
| JP | 2016-226214 | A | | 12/2016 | |
| JP | 2019129588 | A | * | 8/2019 | |
| JP | 2021-112043 | A | | 8/2021 | |
| JP | 2022092720 | A | * | 6/2022 | .............. H02M 1/00 |
| KR | 20-0352458 | Y1 | | 6/2004 | |
| WO | WO-2020054539 | A1 | * | 3/2020 | ............ H02M 7/003 |

* cited by examiner 100
100s 112b
112a
S112
S111
L1
111a
111b
111c
P9
P8
P7
P6
S105
A121
A131
122c
122d
132c
132d
108d
108e
108c
108a
108b
108
S122
S132
P5
P4
P3
P2
P1
122a
122b
132a
132b

POWER SUPPLY SUBSTRATE INCLUDING TRANSFORMER AND SNUBBER CIRCUIT

FIELD OF THE INVENTION AND RELATED ART

The present invention relates to a power supply substrate and an image forming apparatus provided with the power supply substrate.

The image forming apparatus is provided with the power supply substrate which generates direct current voltage from alternating current voltage. The image forming apparatus is required to be downsized to improve user's convenience, and therefore the power supply substrate provided to the image forming apparatus is also required to be downsized. In order to downsize the power supply substrate, it is necessary to reduce a substrate area by utilizing an unutilized space on the substrate efficiently.

SUMMARY OF THE INVENTION

On a power supply substrate, a winding transformer which transforms voltage on a primary side to voltage on a secondary side is mounted, and the winding transformer is a relatively large-sized component among electric components which constitute the power supply substrate.

On a back side of a substrate surface on which the winding transformer is mounted, there is a space where an electrical component can be disposed, and utilizing this space leads to downsizing of the power supply substrate.

An object of the present invention is to downsize the power supply substrate by utilizing the unutilized space on the substrate.

In order to solve the aforementioned problems, the present invention includes the following configuration.

(1) A power supply substrate for transforming an input voltage on a primary side and outputting an output voltage from a secondary side, the power supply substrate comprising: a transformer including a primary winding and a secondary winding; a switching element connected to the primary winding and configured to perform a switching operation; and a snubber circuit connected to the primary winding, wherein the transformer includes a first input terminal and a second input terminal to which the input voltage is supplied, and mounted on a first surface of the power supply substrate, wherein a second surface which is a surface opposite to the first surface includes a first solder portion and a second solder portion for soldering, wherein the first input terminal is soldered to the first solder portion, wherein the second input terminal is soldered to the second solder portion, and wherein the snubber circuit includes a surface mounting component at least in a part thereof, is overlapped with the transformer as viewed in a direction perpendicular to the first surface of the power supply substrate, and is connected to the first solder portion and the second solder portion.

(2) A power supply substrate for transforming an input voltage on a primary side and outputting an output voltage from a secondary side, the power supply substrate comprising: a transformer including a primary winding and a secondary winding; a switching element connected to the primary winding and configured to perform a switching operation; a rectifying smoothing circuit configured to rectify and smooth an output voltage outputted from the secondary winding; and a control circuit configured to detect the output voltage and perform feedback control, wherein the transformer includes a first output terminal and a second output terminal through which a voltage from the secondary winding is outputted, and is mounted on a first surface of the power supply substrate, wherein a second surface which is a surface opposite to the first surface includes a third solder portion and a fourth solder portion for soldering, wherein the first output terminal is soldered to the third solder portion, wherein the second output terminal is soldered to the fourth solder portion, and wherein the control circuit includes a surface mounting component at least in a part thereof and is overlapped with the transformer as viewed in a direction perpendicular to the first surface of the power supply substrate, and wherein a patten of the control circuit passes through between the third solder portion and the fourth solder portion.

(3) An image forming apparatus for forming an image on a recording material, wherein the power supply substrate according to above (1) and (2) is used for a power supply of the image forming apparatus.

Further features of the present invention will become apparent from the following description of exemplary embodiments with reference to the attached drawings.

DESCRIPTION OF THE EMBODIMENTS

Embodiment 1

Circuit Configuration of a Power Supply Substrate

Figure 1:
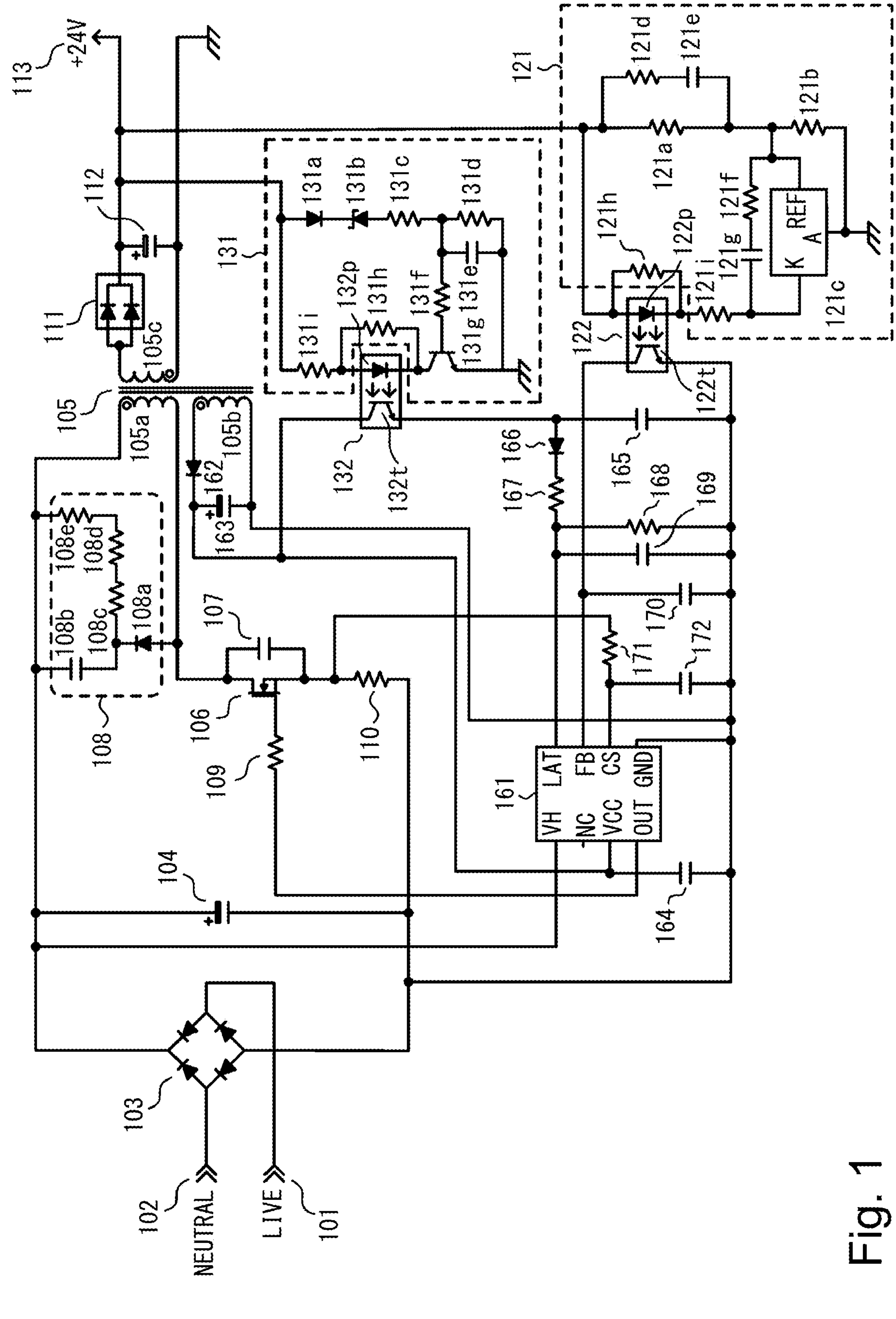
FIG. 1 is a power supply circuit diagram in an Embodiment 1.

A configuration of a power supply substrate 100 (substrate) in an Embodiment 1 will be described with reference to the drawings. FIG. 1 is a power supply circuit diagram in the Embodiment 1. The power supply substrate 100 is a substrate on which a power supply circuit which transforms an input voltage on a primary side into an output voltage output from a secondary side is mounted. To the power supply substrate 100, power from an alternating current (AC) power supply is supplied via a LIVE line 101 and a NEUTRAL line 102, which are two power supply lines, through a filter circuit (not shown). Voltage (AC voltage) and frequency of the AC power supply are, for example, 115 V/60 Hz or 230 V/50 Hz. The AC voltage being generated between the LIVE line 101 and the NEUTRAL line 102 is rectified and smoothed by a bridge diode 103 and a primary smoothing capacitor 104 to produce direct current (DC) voltage.

The produced DC voltage is supplied to a winding transformer 105 (transformer), which includes a primary winding 105$a$, an auxiliary winding 105$b$ and a secondary winding 105$c$. To the primary winding 105$a$ in the winding transformer 105, a MOSFET (metal oxide semiconductor field effect transistor) 106 is serially connected. By the MOSFET

106 as a switching element performing a switching operation, an alternating magnetic field is generated in the winding transformer 105, and energy stored in the primary winding 105*a* is transferred to the secondary winding 105*c*.

A capacitor 107 is provided to suppress surge voltage generated between a drain and a source of the MOSFET 106. The power supply substrate 100 is provided with a snubber circuit 108, and the snubber circuit 108 is constituted by a diode 108*a*, a capacitor 108*b*, a resistor 108*c*, a resistor 108*d* and a resistor 108*e*. The snubber circuit 108 includes resistors constituted by at least two or more components, and in the Embodiment 1, the snubber circuit 108 includes the three resistors 108*c*, 108*d* and 108*e*. The snubber circuit 108 is connected between terminals of the primary winding 105*a* and is provided to suppress surge voltage generated between the terminals of the primary winding 105*a*.

A resistor 109 is a gate resistor for the MOSFET 106, and a resistor 110 is a resistor which detects a current flowing between the drain and the source of the MOSFET 106. The AC voltage generated in the secondary winding 105*c* is rectified and smoothed by a rectifying smoothing circuit constituted by a rectifying diode 111 and a secondary smoothing capacitor 112 (smoothing capacitor), and is output as an output voltage 113 of the power supply circuit. A voltage value of the output voltage 113 is +24 V, for example.

A feedback control circuit 121 as a control circuit is a circuit which performs feedback control for constant voltage to control the output voltage 113 to constant voltage. The feedback control circuit 121 includes a surface mounting component at least in a part thereof. The feedback control circuit 121 detects the output voltage 113 and controls a current flowing to a light emitting diode (LED) 122*p* of a photocoupler 122. A resistor 121*a* and a resistor 121*b* are resistors which detect the output voltage 113, and voltage divided by the resistor 121*a* and the resistor 121*b* are supplied to an REF terminal of a shunt regulator IC 121*c*. The shunt regulator IC 121*c* controls a current at a cathode terminal (K terminal) in response to a voltage in the REF terminal, and controls the current flowing to the LED 122*p* of the photocoupler 122. A resistor 121*d*, a capacitor 121*e*, a resistor 121*f* and a capacitor 121*g* are components provided for phase compensation. A resistor 121*h* is a shunt resistor and a resistor 121*i* is a current limiting resistor.

An overvoltage detecting circuit 131 is a circuit which detects that the output voltage 113 of the power supply circuit becomes an overvoltage (abnormal state) and controls a current flowing to a LED 132*p* of a photocoupler 132.

The overvoltage detecting circuit 131 includes a surface mounting component at least in a part thereof. As a zener diode 131*b*, a component having a zener voltage Vz which does not operate when the power supply circuit outputs normal output voltage is selected. For example, a component having the zener voltage Vz of 27 V is selected. In a case in which the output voltage 113 of the power supply circuit becomes overvoltage (abnormal state) and a voltage at both ends of the zener diode 131*b* exceeds the zener voltage Vz, a current flows as follows. That is, the current flows through a diode 131*a*, the zener diode 131*b*, a resistor 131*c*, a resistor 131*d*, a capacitor 131*e* and a resistor 131*f*, and a transistor 131*g* is turned on. When the transistor 131*g* is turned on, the current flows to the LED 132*p* of the photocoupler 132. A resistor 131*h* is a shunt resistor and a resistor 131*i* is a current limiting resistor.

A power supply IC 161 is a component which controls the power supply circuit. A VH terminal is a terminal which detects supply of a startup current and a brownout, and is connected to a line to which a positive terminal of the primary smoothing capacitor 104 is connected. An NC terminal is an unused terminal. A VCC terminal is a terminal to which a power supply of the power supply IC 161 is supplied, and a voltage, where an AC voltage of the auxiliary winding 105*b* of the winding transformer 105 is rectified and smoothed by a diode 162 and a capacitor 163, is supplied thereto. A capacitor 164 is a bypass capacitor. An OUT terminal is a terminal to which a square wave which switches the MOSFET 106 is output, and is connected to a gate terminal of the MOSFET 106 via the resistor 109.

An LAT terminal is a terminal which detects an abnormality and stops operation of the power supply IC 161, and is connected to a phototransistor 132*t* of the photocoupler 132 via a circuit constituted by a capacitor 165, a diode 166, a resistor 167, a resistor 168 and a capacitor 169. An FB terminal is a terminal which detects a feedback signal from the feedback control circuit 121 on the secondary side, and is connected to a capacitor 170 and a phototransistor 122*t* of the photocoupler 122. The power supply IC 161 controls frequency and duty (DUTY) of the square wave output from the OUT terminal in response to voltage level of the FB terminal, and, by controlling the switching operation of the MOSFET 106, controls so as the output voltage 113 on the secondary side to be constant. A CS terminal is a terminal which detects a current flowing between the drain and the source of the MOSFET 106, and is connected to one end of the resistor 110 via a filter circuit constituted by a resistor 171 and a capacitor 172. A GND (ground) terminal is connected to a line to which a negative terminal of the primary smoothing capacitor 104 is connected.

Pattern Configuration of the Power Supply Substrate

Figure 2:
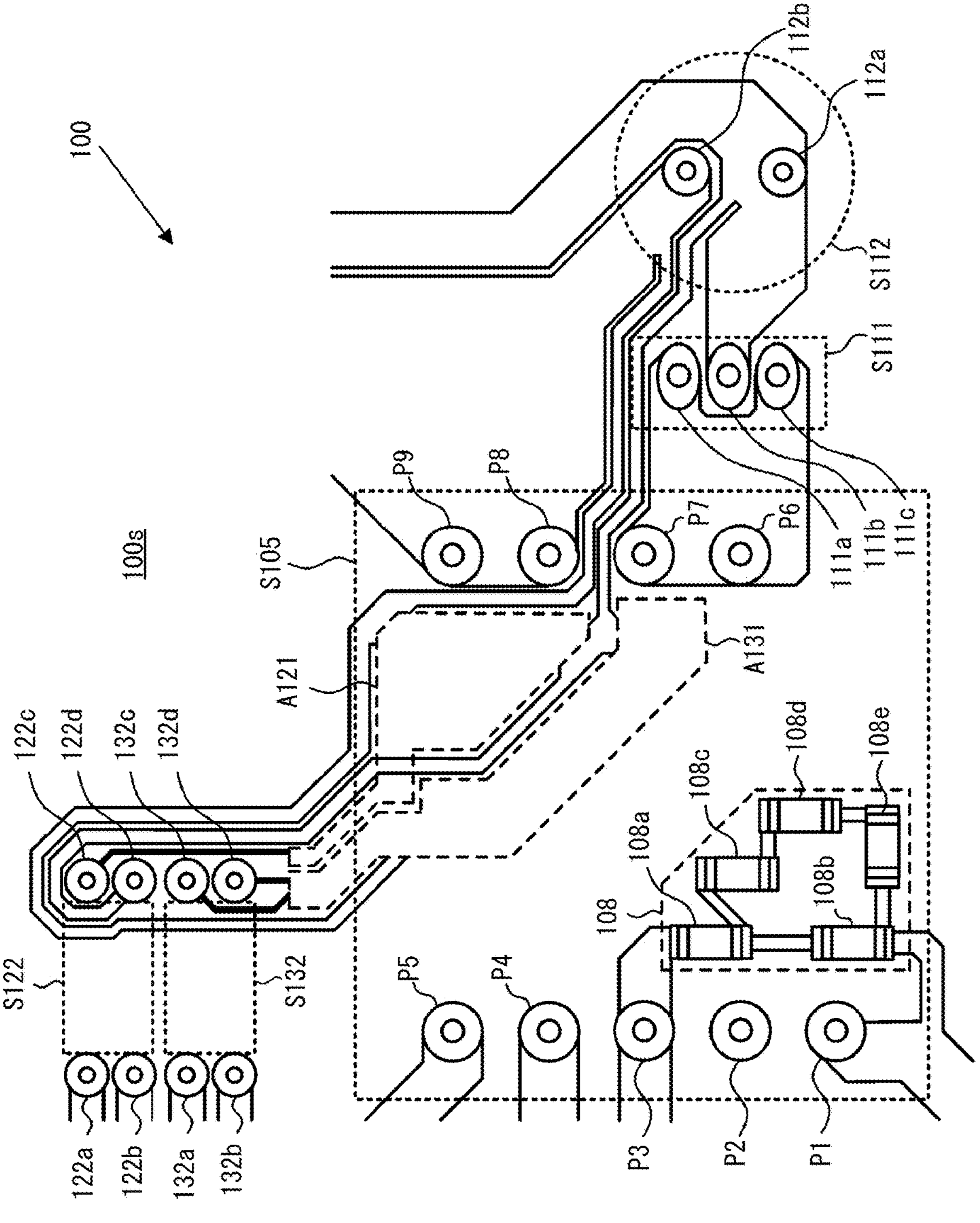
FIG. 2 is a pattern diagram of a power supply substrate in the Embodiment 1.

FIG. 2 is a pattern diagram of the power supply substrate 100 in the Embodiment 1. FIG. 2 illustrates a solder surface 100*s* (second surface opposite to a first surface) of a single side substrate and also a region on a back side of a substrate surface (first surface) on which the winding transformer 105 is mounted. A dotted line S105 represents an outer shape of the winding transformer 105, and the winding transformer 105 is mounted on a component surface (substrate surface), which is a back side of the solder surface 100*s*. Here, the outer shape of the winding transformer 105 refers to an outer shape of a region where the winding transformer 105 is projected onto the power supply substrate 100 as viewed from a direction perpendicular (normal direction) to the power supply substrate 100 in a state in which the winding transformer 105 is mounted on the power supply substrate 100. The same applies to cases in which the "outer shape" is used for other components. A land P1, a land P2 and a land P3 are lands to which terminals of the primary winding 105*a* are soldered, and the land P2 is a land to which an intermediate terminal of the primary winding 105*a* is connected. Specifically, the winding transformer 105 includes a first input terminal and a second input terminal to which input voltage is supplied. The solder surface 100*s* of the power supply substrate 100 includes the land P1 as a first solder portion and the land P3 as a second solder portion. The first input terminal of the winding transformer 105 is soldered to the land P1, and the second input terminal is soldered to the land P3.

A region of the snubber circuit 108 is shown as a broken line, which also represents a pattern on which the diode 108*a*, the capacitor 108*b*, the resistors 108*c*, 108*d* and 108*e* are mounted. The snubber circuit 108 is constituted by the surface mounting component at least in a part thereof. The snubber circuit 108 is disposed on the back side of the substrate surface, on which the winding transformer 105 is mounted, and is connected to the land P1 and the land P3 of the winding transformer 105. In addition, the land P1 and the land P3 are connected to the components on the primary side, which are not shown in FIG. 2, by the pattern. As such, the snubber circuit 108 includes the surface mounting component at least in a part thereof, is mounted within the projected region (within the dotted line S105), which is the region to which the winding transformer 105 is projected on the solder surface 100*s* when the winding transformer 105 is mounted on the substrate surface, and is connected to the land P1 and the land P3. In other words, the winding transformer 105 and the snubber circuit 108 are overlapped with each other as viewed in the direction perpendicular to the solder surface 100*s* of the power supply substrate 100. By this, it becomes possible to utilize a space on the substrate, which is conventionally unutilized.

A land P4 and a land P5 are the lands to which terminals of the auxiliary winding 105*b* are soldered. The land P4 and the land P5 are connected to the components on the primary side, which are not shown in FIG. 2, by the pattern. A land P6 and a land P7 are lands to which output terminals of the secondary winding 105*c* are soldered, and a land P8 and a land P9 are lands to which the GND terminals of the secondary winding 105*c* are soldered. More specifically, the winding transformer 105 includes a first output terminal and a second output terminal through which a voltage from the secondary winding 105*c* is output. The solder surface 100*s* of the power supply substrate 100 includes the land P6 and the land P7 as third solder portions and the land P8 and the land P9 as fourth solder portions for soldering. The first output terminal of the winding transformer 105 is soldered to the land P6 or the land P7, and the second output terminal is soldered to the land P8 or the land P9.

A dotted line S111 represents an outer shape of the rectifying diode 111, and the rectifying diode 111 is mounted on the component surface, which is the back side of the solder surface 100*s*. A land 111*a* and a land 111*c* are lands to which anode terminals of the rectifying diode 111 are soldered, and are connected to the land P6 and the land P7 of the winding transformer 105 by the pattern. A land 111*b* is a land to which a cathode terminal of the rectifying diode 111 is soldered.

A dotted line S112 represents an outer shape of the secondary smoothing capacitor 112, and the secondary smoothing capacitor 112 is mounted on the component surface, which is the back side of the solder surface 100*s*. A land 112*a* is a land to which a positive terminal of the secondary smoothing capacitor 112 is soldered, and is connected to the land 111*b* of the rectifying diode 111 by the pattern. In addition, the land 112*a* is connected to the components on the secondary side, which are not shown, by the pattern. A land 112*b* is a land to which a negative terminal of the secondary smoothing capacitor 112 is soldered, and is connected to the land P8 and the land P9 of the winding transformer 105 by the pattern. In addition, the land 112*b* is connected to the components on the secondary side, which are not shown, by the pattern.

A region of a broken line A121 represents a region on which the feedback control circuit 121 is mounted, is constituted by the surface mounting components, and is disposed on the solder surface 100*s*, which is the back side of the substrate surface on which the winding transformer 105 is mounted. As to the individual components, illustration thereof is omitted. A power supply line for the feedback control circuit 121 is wired from the land 112*a* of the secondary smoothing capacitor 112 passing through between the land P7 and the land P8 of the winding transformer 105. In addition, the GND line of the feedback control circuit 121 is wired from the land 112*b* of the secondary smoothing capacitor 112 passing through between the land P7 and the land P8 of the winding transformer 105. In other words, the feedback control circuit 121 is mounted within the projected region (within the dotted line S105), which is the region to which the winding transformer 105 is projected on the solder surface 100*s* when the winding transformer 105 is mounted on the substrate surface. In other words, the winding transformer 105 and the feedback control circuit 121 are overlapped with each other as viewed in the direction perpendicular to the solder surface 100*s* of the power supply substrate 100. And the wiring (pattern) of the power supply line and the GND line of the feedback control circuit 121 pass through between the land P7 and the land P8.

A region of a broken line A131 represents a region on which the overvoltage detecting circuit 131 is mounted, is constituted by the surface mounting components, and is disposed on the solder surface 100*s*, which is the back side of the substrate surface on which the winding transformer 105 is mounted. As to the individual components, illustration thereof is omitted. A power supply line for the overvoltage detecting circuit 131 is wired from the land 112*a* of the secondary smoothing capacitor 112, as is the feedback control circuit 121. The power supply line for the overvoltage detecting circuit 131 passes through between the land P7 and the land P8 of the winding transformer 105, and is wired thereto with split to the line to the feedback control circuit 121 on the way. In addition, the GND line of the overvoltage detecting circuit 131 is wired from the land 112*b* of the secondary smoothing capacitor 112, as is the feedback control circuit 121. The GND line of the overvoltage detecting circuit 131 passes through between the land P7 and the land P8 of the winding transformer 105, and is wired thereto with split to the line to the feedback control circuit 121 on the way. As such, the overvoltage detecting circuit 131 is also mounted within the projected region (S105), which is the region to which the winding transformer 105 is projected on the solder surface 100*s* when the winding transformer 105 is mounted on the substrate surface. In other words, the winding transformer 105 and the overvoltage detecting circuit 131 are overlapped with each other as viewed in the direction perpendicular to the solder surface 100*s* of the power supply substrate 100. And the wiring (pattern) of the power supply line and the GND line of the overvoltage detecting circuit 131 also pass through between the land P7 and the land P8. As such, by disposing the feedback control circuit 121 and the overvoltage detecting circuit 131 within the dotted line S105 on the solder surface 100*s*, it becomes possible to utilize the space on the substrate, which is conventionally unutilized.

A dotted line S122 represents an outer shape of the photocoupler 122, and the photocoupler 122 is mounted on the component surface, which is the back side of the solder surface 100*s*. A land 122*a* and a land 122*b* are lands to which terminals on the primary side are soldered, and are connected to components on the primary side, which are not shown, by the pattern. A land 122*c* and a land 122*d* are lands to which terminals on the secondary side are soldered. The land 122*c* is connected to the feedback control circuit 121 by the pattern, and the land 122*d* is connected to the power supply line of the feedback control circuit 121 and the power supply line of the overvoltage detecting circuit 131 by the pattern.

A dotted line S132 represents an outer shape of the photocoupler 132, and the photocoupler 132 is mounted on the component surface, which is the back side of the solder surface 100*s*. A land 132*a* and a land 132*b* are lands to which terminals on the primary side are soldered, and are connected to the components on the primary side, which are not shown, by the pattern. A land 132*c* and a land 132*d* are lands to which the terminals on the secondary side are soldered, and are connected to the overvoltage detecting circuit 131 by the pattern.

The circuit on the primary side and the circuit on the secondary side must secure an isolation distance therebetween, which is specified in a safety standard. Incidentally, in the circuit on the primary side, the lands P1, P2, P3, P4 and P5 of the winding transformer 105 and the snubber circuit 108 are included, and in the circuit on the secondary side, the lands P6, P7, P8 and P9 of the winding transformer 105, the feedback control circuit 121 and the overvoltage detecting circuit 131 are included. In the Embodiment 1, since the snubber circuit 108 is constituted by the surface mounting components and the resistor is mounted with being divided into three resistors 108*c*, 108*d* and 108*e*, degree of freedom for component mounting layout is increased. Therefore, even if the components are disposed on the back side of the substrate surface (solder surface 100*s*) on which the winding transformer 105 is mounted, the necessary insulated distance can be secured.

Circuit Loop of the Feedback Control Circuit

Figure 3:
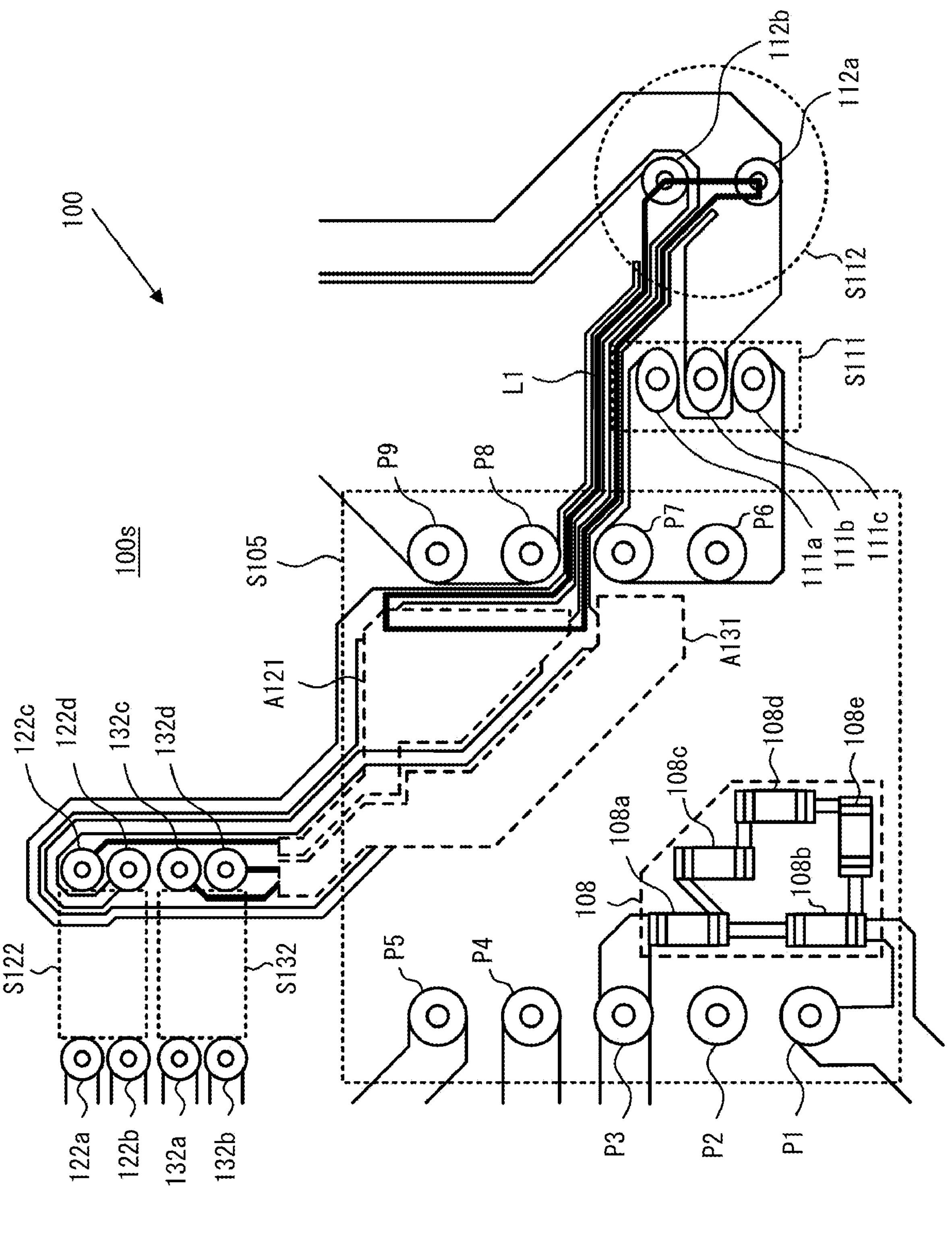
FIG. 3 is a view illustrating a circuit loop L1 in the Embodiment 1.

FIG. 3 is a view in which a circuit loop L1 as a first circuit loop is illustrated on the pattern diagram in FIG. 2. Since contents other than the circuit loop L1 are the same as in FIG. 2, description thereof will be omitted. The circuit loop L1 represents a circuit loop formed by the power supply line and the GND line being wired from the secondary smoothing capacitor 112 to the feedback control circuit 121. Windings of the winding transformer 105 are wound so that a circles are formed on a plane parallel to the substrate surface, and therefore magnetic flux, which is generated when current flows through the windings, is generated in a direction perpendicular to the substrate surface. While major magnetic flux passes through inside a core which is provided to the winding transformer 105, other leakage magnetic flux, which is generated outside the core, is generated in a direction penetrating through the substrate surface. If the leakage magnetic flux is generated inside the circuit loop which exists on the substrate surface, electromagnetic induction causes induced current to flow in the circuit loop, resulting in circuit malfunction. In order to reduce the effect of the leakage magnetic flux of the winding transformer 105, it is necessary to make the circuit loop smaller and to reduce the induced current. As to the feedback control circuit 121, the components are disposed on the back side of the substrate surface on which the winding transformer 105 is mounted. Along with this, the feedback control circuit 121 is disposed near the land P7 and the land P8 of the winding transformer 105 so that the circuit loop L1 is minimized to reduce the effect of the leakage magnetic flux of the winding transformer 105. Here, the circuit loop formed by the power supply line and the GND line being wired from the secondary smoothing capacitor 112 to the feedback control circuit 121 is not only one pattern of the circuit loop L1, but several patterns thereof may be possible. In the Embodiment 1, the circuit loop L1 is one in which an area of a region formed by the circuit loop becomes the smallest of each area of region formed by a plurality of circuit loops, which can be disposed on the solder surface 100*s*.

Circuit Loop of the Overvoltage Detecting Circuit

Figure 4:
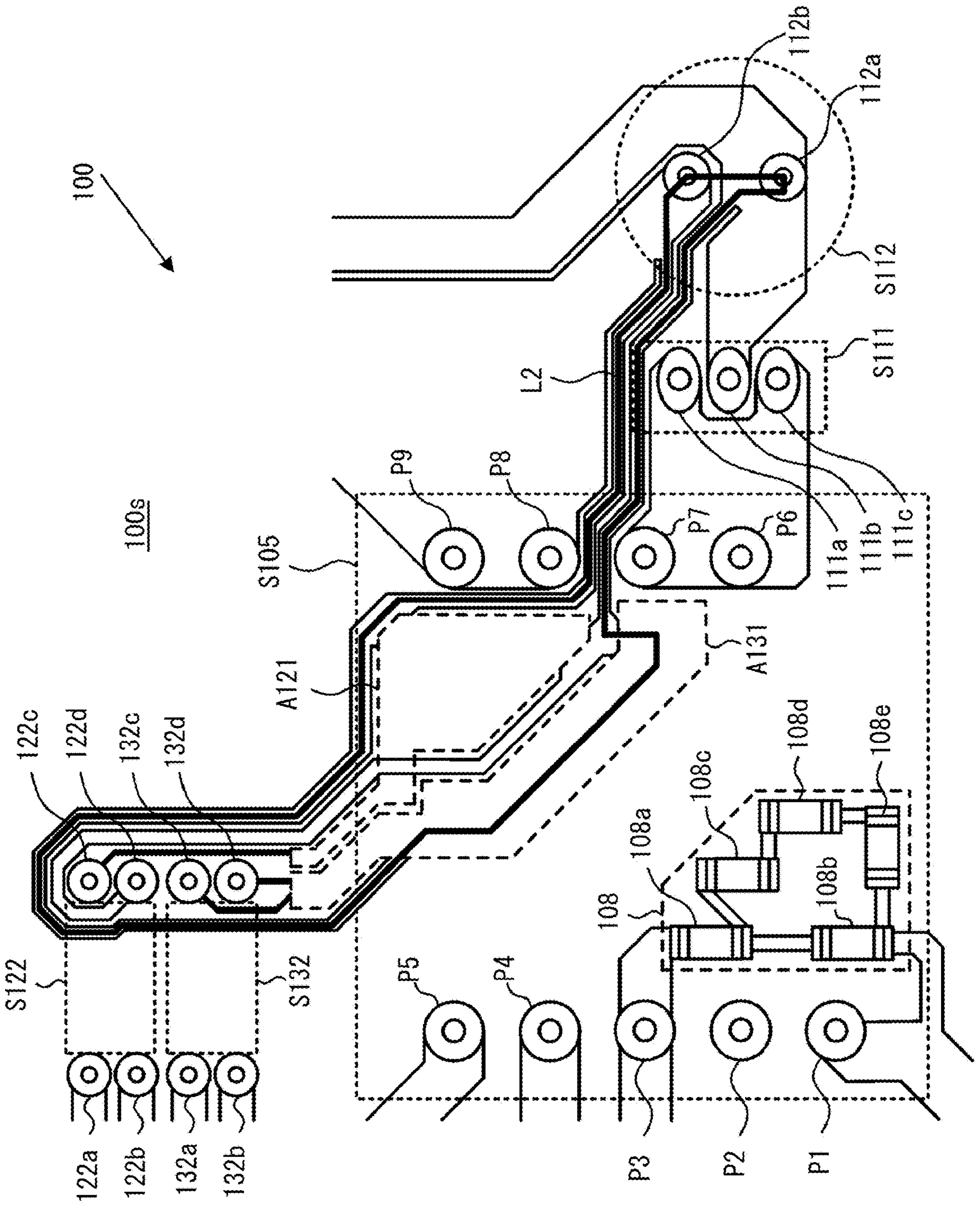
FIG. 4 is a view illustrating a circuit loop L2 in the Embodiment 1.

FIG. 4 is a view in which a circuit loop L2 as a second circuit loop is illustrated on the pattern diagram in FIG. 2. Since contents other than the circuit loop L2 are the same as in FIG. 2, description thereof will be omitted. The circuit loop L2 represents a circuit loop formed by the power supply line and the GND line being wired from the secondary smoothing capacitor 112 to the overvoltage detecting circuit 131. Compared to the circuit loop L1 in FIG. 3, the circuit loop L2 has a larger loop. In other words, the overvoltage detecting circuit 131 is disposed within the projected region so that the circuit loop L2, which is formed by the overvoltage detecting circuit 131 and the secondary smoothing capacitor 112, is larger than the circuit loop L1. In addition, the component mounting region A131 of the overvoltage detecting circuit 131 is farther from the land P7 and the land P8 of the winding transformer 105 than the component mounting region A121 of the feedback control circuit 121. In more detail, the entire component mounting region A121 of the feedback control circuit 121 is disposed near the lands P7 and P8. In contrast, the component mounting region A131 of the overvoltage detecting circuit 131 is narrower and longer, compared to the component mounting region A121, and extends in a direction going away from the lands P7 and P8. The component mounting region A131 of the overvoltage detecting circuit 131 is an example in which the component mounting region A131 is not disposed near the land P7 and the land P8 of the winding transformer 105 so that the circuit loop L2 is minimized.

As described above, the feedback control circuit 121 is disposed near the land P7 and the land P8 so that the circuit loop L1 formed by the feedback control circuit 121 and the secondary smoothing capacitor 112 is the smallest of the patterns which can be disposed on the solder surface 100*s*.

The feedback control circuit 121 is disposed near the land P7 and the land P8 of the winding transformer 105 since the feedback control circuit 121 is more susceptible to noise, when comparing the feedback control circuit 121 with the overvoltage detecting circuit 131.

As described above, according to the Embodiment 1, it becomes possible to downsize the power supply substrate by utilizing an unutilized space on the substrate.

Embodiment 2

A configuration of a power supply substrate 200 in an Embodiment 2 will be described with reference to the drawings. While, in the Embodiment 1, the example in which the snubber circuit 108 is constituted by the diodes, the resistors and the capacitors is described, in the Embodiment 2, a configuration in which a power clamper is used will be described.

Circuit Configuration of the Power Supply Substrate

Figure 5:
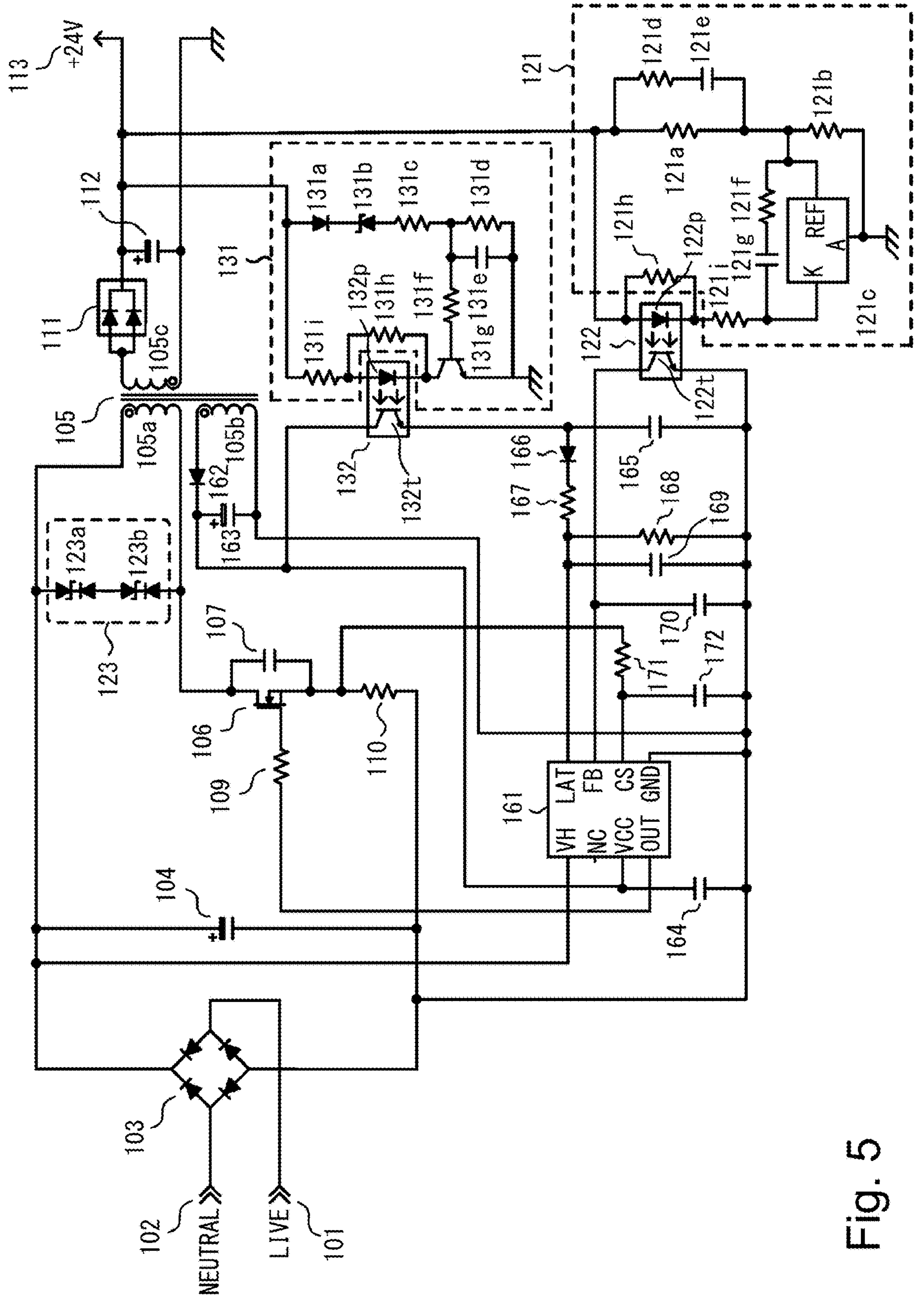
FIG. 5 is a power supply circuit diagram in an Embodiment 2.

FIG. 5 is a power supply circuit diagram which is mounted on the power supply substrate 200 in the Embodiment 2. A snubber circuit 123 in the Embodiment 2 includes the power clamper, and in more detail, the snubber circuit 123 has a configuration in which two power clampers of a power clamper 123*a* and a power clamper 123*b* are serially connected to each other. The power clampers 123*a* and 123*b* are ones in which a direct current reverse voltage is 120 V, for example. Similar to the snubber circuit 108 in the Embodiment 1, the snubber circuit 123 is connected between the terminals of the primary winding 105*a* and is provided to suppress the surge voltage generated between the terminals of the primary winding 105*a*. The other components are the same as in FIG. 1 described in the Embodiment 1, therefore description thereof will be omitted.

Pattern Configuration of the Power Supply Substrate

Figure 6:
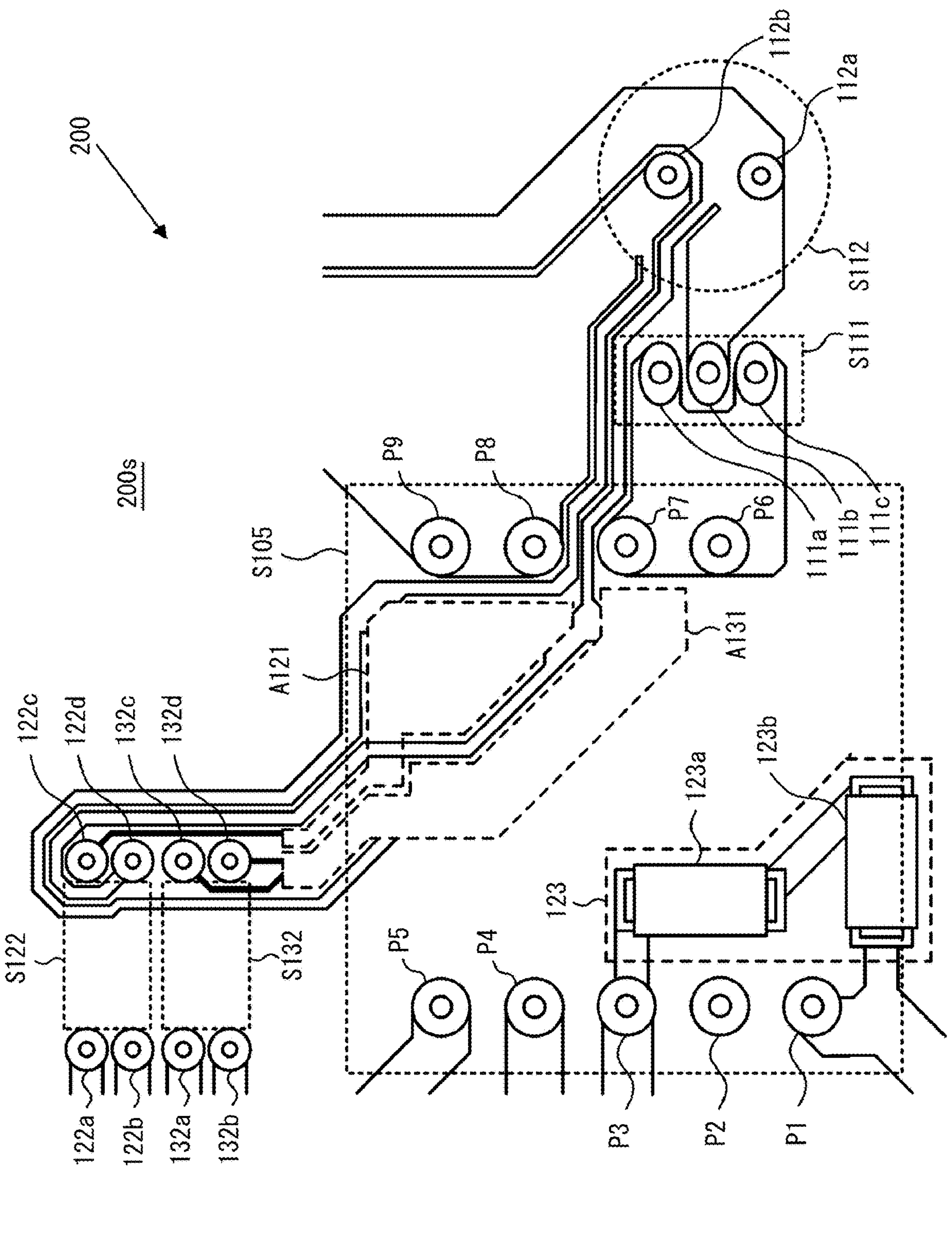
FIG. 6 is a pattern diagram of a power supply substrate in the Embodiment 2.

FIG. 6 is a pattern diagram in the Embodiment 2. Two power clampers of the power clamper 123*a* and the power clamper 123*b* are serially connected to each other and are constituted by surface mounting components. The power clampers 123*a* and 123*b* are disposed on a solder surface 200*s*, which is the back side of the substrate surface on which the winding transformer 105 is mounted, and are connected to the land P1 and the land P3 of the winding transformer 105. The other components are the same as in FIG. 2 described in the Embodiment 1, therefore description thereof will be omitted. In addition, the same is true for the circuit loops L1 and L2 described in FIG. 3 and FIG. 4, respectively.

As described above, according to the Embodiment 2, it becomes possible to downsize the power supply substrate by utilizing the unutilized space on the substrate.

Embodiment 3

Configuration of an Image Forming Apparatus

Figure 7:
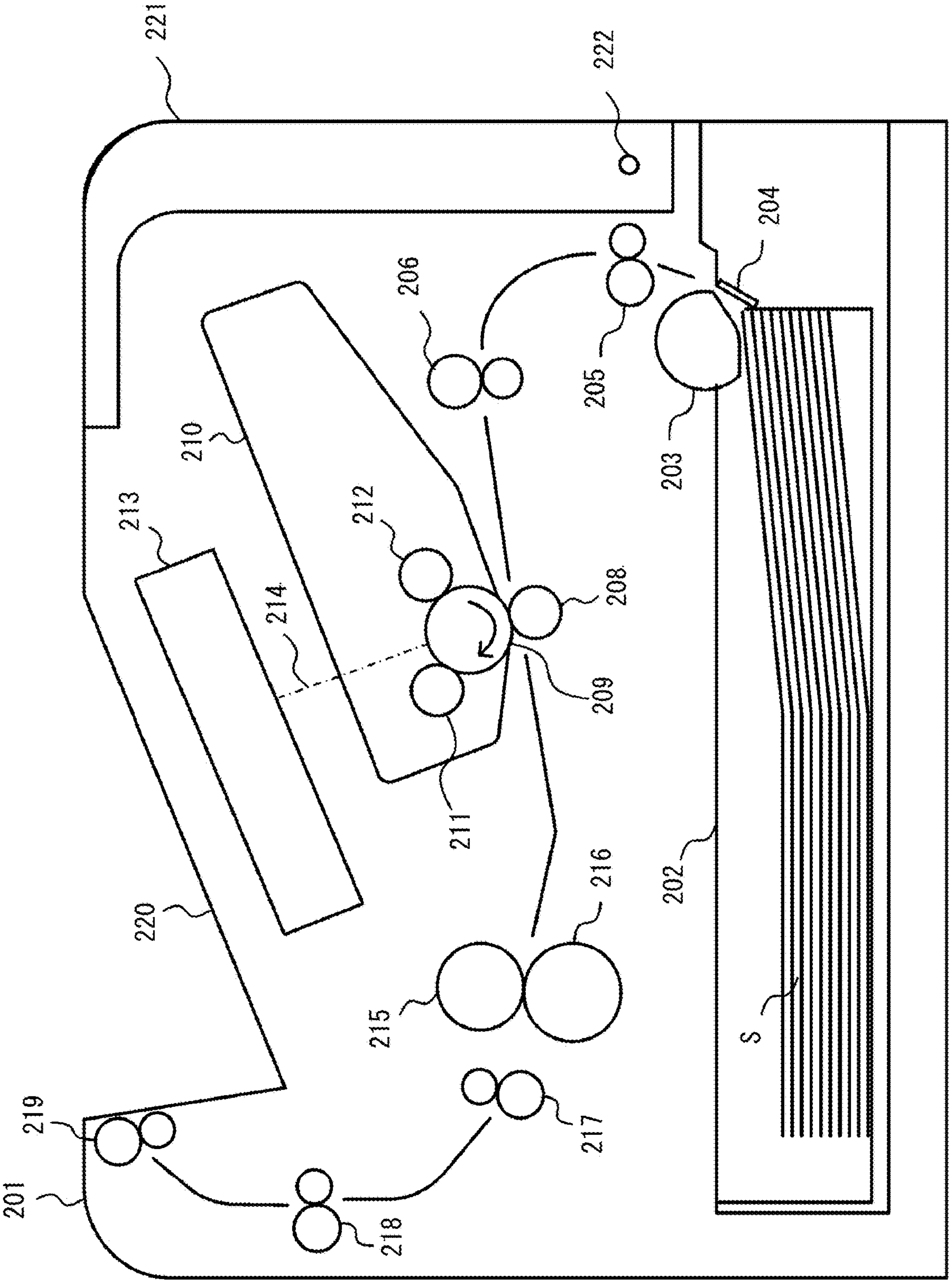
FIG. 7 is a schematic cross-sectional view of an image forming apparatus in an Embodiment 3.

In an Embodiment 3, an example in which the power supply substrate 100 or 200 described in the Embodiment 1 and the Embodiment 2, respectively, is applied to an image forming apparatus will be described. FIG. 7 is a schematic cross-sectional view of an image forming apparatus 201 which performs image formation on a recording material. With reference to FIG. 7, a configuration of the image forming apparatus 201 will be described.

In a sheet feeding cassette 202, a sheet S which is the recording material is stacked. As the sheet S, various types of paper such as a plain paper, a thin paper, a thick paper, an OHP sheet and a rough paper can be used. The sheet S is fed by a feeding roller 203 and separated by frictional force of a separating pad 204, and only one sheet S is fed to a conveyance roller pair 205. The sheet S is then conveyed through the conveyance roller pair 205 and a registration roller pair 206 to a transfer nip portion, in which a photosensitive drum 209 and a transfer roller 208 are in contact with each other. A process cartridge 210 is a mountable and dismountable unit in which the photosensitive drum 209, a charging roller 211 and a developing roller 212 are integrated. The photosensitive drum 209 is rotated in a direction of an arrow in FIG. 7, and is an image bearing member which bears an electrostatic latent image and a toner image. The charging roller 211 is a member which charges a surface of the photosensitive drum 209 to uniform potential, and charging voltage is applied thereto from an unshown higher voltage power supply. A laser scanner unit 213 irradiates the photosensitive drum 209 with a laser beam 214 corresponding to image data, exposes the uniformly charged surface of the photosensitive drum 209, and forms the electrostatic latent image on the surface of the photosensitive drum 209. The developing roller 212 develops the electrostatic latent image by adhering toner to the electrostatic latent image formed on the photosensitive drum 209 to form the toner image. To the developing roller 212, developing voltage is applied from an unshown high voltage power supply.

The transfer roller 208 transfers the toner image on the photosensitive drum 209 to the sheet S. To the transfer roller 208, transfer voltage is applied from an unshown high voltage power supply. The sheet S, onto which the toner image has been transferred, is heated and pressed by a fixing film 215 and a pressing roller 216, and unfixed toner on the sheet S is melted and fixedly adhered to the sheet S. The sheet S conveyed by the fixing film 215 and the pressing roller 216 is conveyed by discharging roller pairs 217, 218 and 219, and stacked on a discharge tray 220. A door 221, which also serves as an exterior cover of the image forming apparatus 201, is capable of opening and closing operation by being rotated about a fulcrum 222. In addition, the opening and closing of the door 221 is performed by a worker or a user for mounting or dismounting of the process cartridge 210, jam clearance of the sheet S, maintenance work on the image forming apparatus 201, etc.

The image forming apparatus 201 described above is provided with electrical circuit such as the high voltage power supply, motors, solenoids and sensors. As a power supply for these electrical circuit, the output voltage of the power supply circuit, which generates a predetermined DC voltage from the AC power supply, is used. By applying the configuration of the power supply substrate 100 or 200 described in the Embodiment 1 and the Embodiment 2, respective, to this power supply circuit, the present invention can be applied to the image forming apparatus 201. In addition, in the Embodiment 3, a monochrome image forming apparatus, which performs monochrome image formation and is provided with a single process cartridge, is described, however, the present invention can also be applied to a color image forming apparatus, which is provided with a plurality of the process cartridges.

As described above, according to the Embodiment 3, it becomes possible to downsize the power supply substrate by utilizing the unutilized space on the substrate.

The disclosure of the present embodiments includes the following constitution examples.

Constitution 1

A power supply substrate for transforming an input voltage on a primary side and outputting an output voltage from a secondary side, the power supply substrate comprising:
- a transformer including a primary winding and a secondary winding;
- a switching element connected to the primary winding and configured to perform a switching operation; and
- a snubber circuit connected to the primary winding,
- wherein the transformer includes a first input terminal and a second input terminal to which the input voltage is supplied, and mounted on a first surface of the power supply substrate,
- wherein a second surface which is a surface opposite to the first surface includes a first solder portion and a second solder portion for soldering,
- wherein the first input terminal is soldered to the first solder portion,
- wherein the second input terminal is soldered to the second solder portion, and
- wherein the snubber circuit includes a surface mounting component at least in a part thereof, is overlapped with the transformer as viewed in a direction perpendicular to the first surface of the power supply substrate, and is connected to the first solder portion and the second solder portion.

Constitution 2

The power supply substrate according to Constitution 1, wherein the snubber circuit includes a diode, a resistor and a capacitor.

Constitution 3

The power supply substrate according to Constitution 2, wherein the resistor is constituted of at least two components.

Constitution 4

The power supply substrate according to Constitution 1, wherein the snubber circuit includes a power clamper.

Constitution 5

The power supply substrate according to any one of Constitutions 1 to 4, further comprising a rectifying smoothing circuit configured to rectify and smooth an output voltage outputted from the secondary winding; and a control circuit configured to detect the output voltage and perform feedback control, wherein the transformer includes a first output terminal and a second output terminal through which a voltage from the secondary winding is outputted, wherein the second surface includes a third solder portion and a fourth solder portion for soldering, wherein the first output terminal is soldered to the third solder portion, wherein the second output terminal is soldered to the fourth solder portion, and wherein the control circuit includes a surface mounting component at least in a part thereof and is overlapped with the transformer as viewed in the direction perpendicular to the first surface of the power supply substrate, and wherein a pattern of the control circuit passes through between the third solder portion and the fourth solder portion.

Constitution 6

A power supply substrate for transforming an input voltage on a primary side and outputting an output voltage from a secondary side, the power supply substrate comprising:

a transformer including a primary winding and a secondary winding;

a switching element connected to the primary winding and configured to perform a switching operation;

a rectifying smoothing circuit configured to rectify and smooth an output voltage outputted from the secondary winding; and a control circuit configured to detect the output voltage and perform feedback control, wherein the transformer includes a first output terminal and a second output terminal through which a voltage from the secondary winding is outputted, and is mounted on a first surface of the power supply substrate, wherein a second surface which is a surface opposite to the first surface includes a third solder portion and a fourth solder portion for soldering, wherein the first output terminal is soldered to the third solder portion, wherein the second output terminal is soldered to the fourth solder portion, and wherein the control circuit includes a surface mounting component at least in a part thereof and is overlapped with the transformer as viewed in a direction perpendicular to the first surface of the power supply substrate, and wherein a patten of the control circuit passes through between the third solder portion and the fourth solder portion.

Constitution 7

The power supply substrate according to Constitution 6, wherein the rectifying smoothing circuit includes a smoothing capacitor, and wherein the control circuit is disposed so as to pass through between the third solder portion and the fourth solder portion.

Constitution 8

The power supply substrate according to Constitution 7, further comprising an overvoltage detecting circuit configured to detect an overvoltage of the output voltage, wherein the overvoltage detecting circuit includes a surface mounting component at least in a part thereof and is overlapped with the transformer as viewed in the direction perpendicular to the first surface of the power supply substrate, and wherein a patten of the overvoltage detecting circuit passes through between the third solder portion and the fourth solder portion.

Constitution 9

The power supply substrate according to Constitution 8, wherein when a circuit loop, of a power supply line and a GND line, formed by the control circuit and the smoothing capacitor is defined as a first circuit loop, the overvoltage detecting circuit is disposed so that a second circuit loop, of the power supply line and the GND line, formed by the overvoltage detecting circuit and the smoothing capacitor is larger than the first circuit loop.

Constitution 10

The power supply substrate according to any one of Constitutions 1 to 9, wherein the power supply substrate is a single side substrate.

Constitution 11

The image forming apparatus for forming an image on a recording material, wherein the power supply substrate according to any one of Constitutions 1 to 10 is used for a power supply of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-202274 filed on Nov. 29, 2023, which is hereby incorporated by reference herein in its entirety.

What is claimed is:

1. An image forming apparatus for forming an image on a recording material comprising:

a power supply substrate for transforming an input voltage on a primary side and outputting an output voltage from a secondary side, wherein the power supply substrate includes:

a transformer including a primary winding and a secondary winding;

a switching element connected to the primary winding and configured to perform a switching operation; and a snubber circuit connected to the primary winding, wherein the transformer includes a first terminal and a second terminal for applying the input voltage to the primary winding, and the transformer is mounted on a first surface of the power supply substrate, wherein the power supply substrate includes a second surface opposite to the first surface, the second surface including a first solder portion and a second solder portion, wherein the first terminal is soldered to the first solder portion, wherein the second terminal is soldered to the second solder portion, and wherein the snubber circuit includes a surface mounting component mounted on the second surface, wherein the snubber circuit is connected to the first solder portion and the second solder portion, and wherein, as viewed in a direction perpendicular to the second surface, the surface mounting component is disposed inside an outer shape of the transformer.

2. The power supply substrate according to claim 1, wherein the snubber circuit includes a capacitor, and wherein, as viewed in the direction perpendicular to the second surface, the capacitor is disposed inside the outer shape.

3. The power supply substrate according to claim 1, wherein the surface mounting component is a power clamp.

4. The power supply substrate according to claim 1, further comprising a control circuit configured to detect the output voltage and perform feedback control, wherein the transformer includes a third terminal and a fourth terminal for outputting a voltage from the secondary winding, wherein the second surface includes a third solder portion and a fourth solder portion for soldering, wherein the third terminal is soldered to the third solder portion, wherein the fourth terminal is soldered to the fourth solder portion, wherein, in case the surface mounting component is defined as a first surface mounting component, the control circuit includes a second surface mounting component mounted on the second surface, wherein as viewed in the direction perpendicular to the second surface, the second surface mounting component is disposed inside the outer shape, and wherein a pattern of the control circuit passes between the third solder portion and the fourth solder portion.

5. A power supply substrate for transforming an input voltage on a primary side and outputting an output voltage from a secondary side, the power supply substrate comprising:

a transformer including a primary winding and a secondary winding;

a switching element connected to the primary winding and configured to perform a switching operation;

a rectifying smoothing circuit configured to rectify and smooth an output voltage outputted from the secondary winding and include a smoothing capacitor; and a control circuit configured to detect the output voltage and perform feedback control, wherein the transformer includes a first terminal and a second terminal for outputting a voltage from the secondary winding, and the transformer is mounted on a first surface of the power supply substrate, wherein the power supply substrate includes a second surface opposite to the first surface, the second surface including a first solder portion and a second solder portion for soldering, wherein the first terminal is soldered to the first solder portion, wherein the second terminal is soldered to the second solder portion, and wherein the control circuit includes a surface mounting component mounted on the second surface, wherein, as viewed in a direction perpendicular to the second surface, the surface mounting component is disposed inside an outer shape of the transformer, and wherein a pattern of the control circuit passes between the first solder portion and the second solder portion.

6. The power supply substrate according to claim 5, further comprising an overvoltage detecting circuit configured to detect an overvoltage of the output voltage, wherein, in the case the surface mounting component is defined as a first surface mounting component, the overvoltage detecting circuit includes a second surface mounting component mounted on the second surface, wherein, as viewed in the direction perpendicular to the second surface, the second surface mounting component is disposed inside the outer shape, and wherein a pattern of the overvoltage detecting circuit passes between the first solder portion and the second solder portion.

7. The power supply substrate according to claim 6, wherein when a circuit loop, of a power supply line and a GND line, formed by the control circuit and the smoothing capacitor is defined as a first circuit loop, the overvoltage detecting circuit is disposed so that a second circuit loop, of the power supply line and the GND line, formed by the overvoltage detecting circuit and the smoothing capacitor is larger than the first circuit loop.

8. The power supply substrate according to claim 7, wherein the power supply substrate is a single side substrate.

9. An image forming apparatus for forming an image on a recording material, wherein the power supply substrate according to claim 5 is used for a power supply of the image forming apparatus.

10. The image forming apparatus according to claim 1, wherein the surface mounting component is a resistor.

11. The image forming apparatus according to claim 1, wherein further comprising a diode for rectifying a voltage generated in the secondary winding, wherein the diode is disposed outside the outer shape as viewed in a direction perpendicular to the second surface.

* * * * *